(12) United States Patent
Silder, Jr. et al.

(10) Patent No.: US 6,527,225 B1
(45) Date of Patent: Mar. 4, 2003

(54) METHOD FOR PERFORMING AN AUTOMATED CATEGORY A TAKEOFF

(75) Inventors: Stephen H. Silder, Jr., Stuart, FL (US); Charles W. Evans, Norfolk, CT (US); Christopher A. Thornberg, Newton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/135,945

(22) Filed: Apr. 30, 2002

(51) Int. Cl.⁷ .............................................. B64C 13/16
(52) U.S. Cl. ..................... 244/76 R; 244/194; 244/195; 244/196
(58) Field of Search ............................... 244/76 R, 194, 244/195, 196; 701/15

(56) References Cited

U.S. PATENT DOCUMENTS

| | | | |
|---|---|---|---|
| 5,142,478 A | * | 8/1992 | Crook ........................ 244/183 |
| 5,337,982 A | * | 8/1994 | Sherry ......................... 244/177 |
| 5,499,025 A | * | 3/1996 | Middleton et al. .......... 340/959 |
| 5,982,300 A | * | 11/1999 | Greene ........................ 340/959 |
| 6,259,975 B1 | * | 7/2001 | Rollet et al. ................. 244/175 |
| 6,367,741 B2 | * | 4/2002 | Mezan ........................ 244/194 |
| 2002/0035415 A1 | * | 3/2002 | Gardner .......................... 701/3 |

* cited by examiner

*Primary Examiner*—J. Woodrow Eldred
(74) *Attorney, Agent, or Firm*—Bachman & LaPointe, P.C.

(57) ABSTRACT

A method for automating a takeoff maneuver for an aircraft, comprising the steps of generating a takeoff profile comprising a takeoff point, a flight path, and a takeoff decision point (TDP), engaging an automated takeoff system to access the takeoff profile, receiving periodic position data of the aircraft, comparing the position data to the takeoff profile to compute a plurality of deviations each time the position data is received, outputting the plurality of deviations to a display, converting the plurality of deviations into a plurality of control commands, and maneuvering the aircraft in response to the control commands along the flight path.

25 Claims, 2 Drawing Sheets

METHOD FOR PERFORMING AN AUTOMATED CATEGORY A TAKEOFF

BACKGROUND OF THE INVENTION (1) Field of the Invention

The present invention relates to a method for enabling an automated Category A takeoff maneuver.

(2) Description of Related Art

Multi-engine helicopters operating under FAR Sections 29.51, 29.53, 29.55, 29.59, 29.60, and 29.61 have requirements that define Takeoff Decision Points (TDP), Takeoff Path, Elevated Heliport Takeoff Path, Takeoff Distances and Rejected Takeoff so the aircraft can be certified for Category A operations.

Flying a Category A takeoff is a three dimensional problem comprising the steps of defining a TDP(predefined altitude) and accelerating to a Velocity Takeoff Safety Speed ($V_{TOSS}$). Presently, such a maneuver is typically accomplished by performing a vertical takeoff, arriving at the TDP (predefined altitude), and accelerating the aircraft to $V_{TOSS}$.

If an engine is lost during the departure (raised heliport), the pilot needs to recognize the failure and react by either performing a rejected takeoff or continue the takeoff (dependent on where in the takeoff profile the aircraft is when the engine fails).

On current helicopters the pilot establishes a "light on wheels" condition and starts the climb to the TDP. At the TDP a decision is made whether to continue the departure or conduct a rejected takeoff. In the case of an engine failure, if the aircraft is before or at the TDP the pilot would perform a rejected takeoff and land on the helipad. If the aircraft is above the TDP the pilot would continue the takeoff.

Under optimal conditions, the requirements and demands placed upon a pilot performing such a takeoff are substantial. In the event of an engine failure, the split second requirements of a pilot's decision making process can increase the difficulty of such a takeoff. It would be preferable to offload as many of the requirements of a takeoff to a system external to the pilot which would allow the pilot to focus his attention on a reduced set of mission critical data. The advent of coupled flight controls/directors and Global Positioning Systems (GPS) make possible the real time acquisition of data important to performing a takeoff in an aircraft as well as the ability to act upon such data in an automated fashion.

What is needed therefore is an automated system and method for utilizing such a system to perform Category A takeoff maneuvers. Such a system and method would ideally allow the pilot to monitor an automated takeoff intervening only as his expertise is required.

SUMMARY OF THE INVENTION

Accordingly, it is an object of the present invention to provide a method whereby an aircraft may conduct takeoff in an automated manner.

It is yet another object of the present invention to provide a system for enabling the automated performance of a takeoff.

In accordance with the present invention a method for automating a takeoff maneuver for an aircraft, comprises the steps of generating a takeoff profile comprising a takeoff point, a flight path, and a takeoff decision point (TDP), engaging an automated takeoff system to access the takeoff profile, receiving periodic position data of the aircraft, comparing the position data to the takeoff profile to compute a plurality of deviations each time the position data is received, outputting the plurality of deviations to a display, converting the plurality of deviations into a plurality of control commands, and maneuvering the aircraft in response to the control commands along the flight path.

In accordance with the present invention a system for enabling a takeoff maneuver comprising a positioning system for determining a position of an aircraft and outputting the location as position data, a flight management system (FMS) capable of accessing or computing a takeoff profile, receiving as input the position data, comparing the position data to the takeoff profile to compute deviation data and outputting the deviation data, a deadman switch capable of outputting a status signal, an automatic flight control system/flight director (AFCS/FD) receiving as input the status signal and the deviation data and outputting control commands, at least one trim servo for receiving the control commands and responding so as to alter the speed and direction of the aircraft, and a pilot display receiving as input the deviation data.

In accordance with the present invention a method for simulating an automated takeoff maneuver for an aircraft, comprises the steps of generating a takeoff profile comprising a takeoff point, a flight path, and a takeoff decision point (TDP), engaging an automated takeoff system to access the takeoff profile, receiving periodic simulated position data of the aircraft, comparing the position data to the takeoff profile to compute a plurality of deviations each time the position data is received, outputting the plurality of deviations to a display, converting the plurality of deviations into a plurality of control commands, and configuring a display of a flight simulator in response to the control commands.

DETAILED DESCRIPTION OF THE PREFERRED EMBODIMENT(S)

Figure 1:
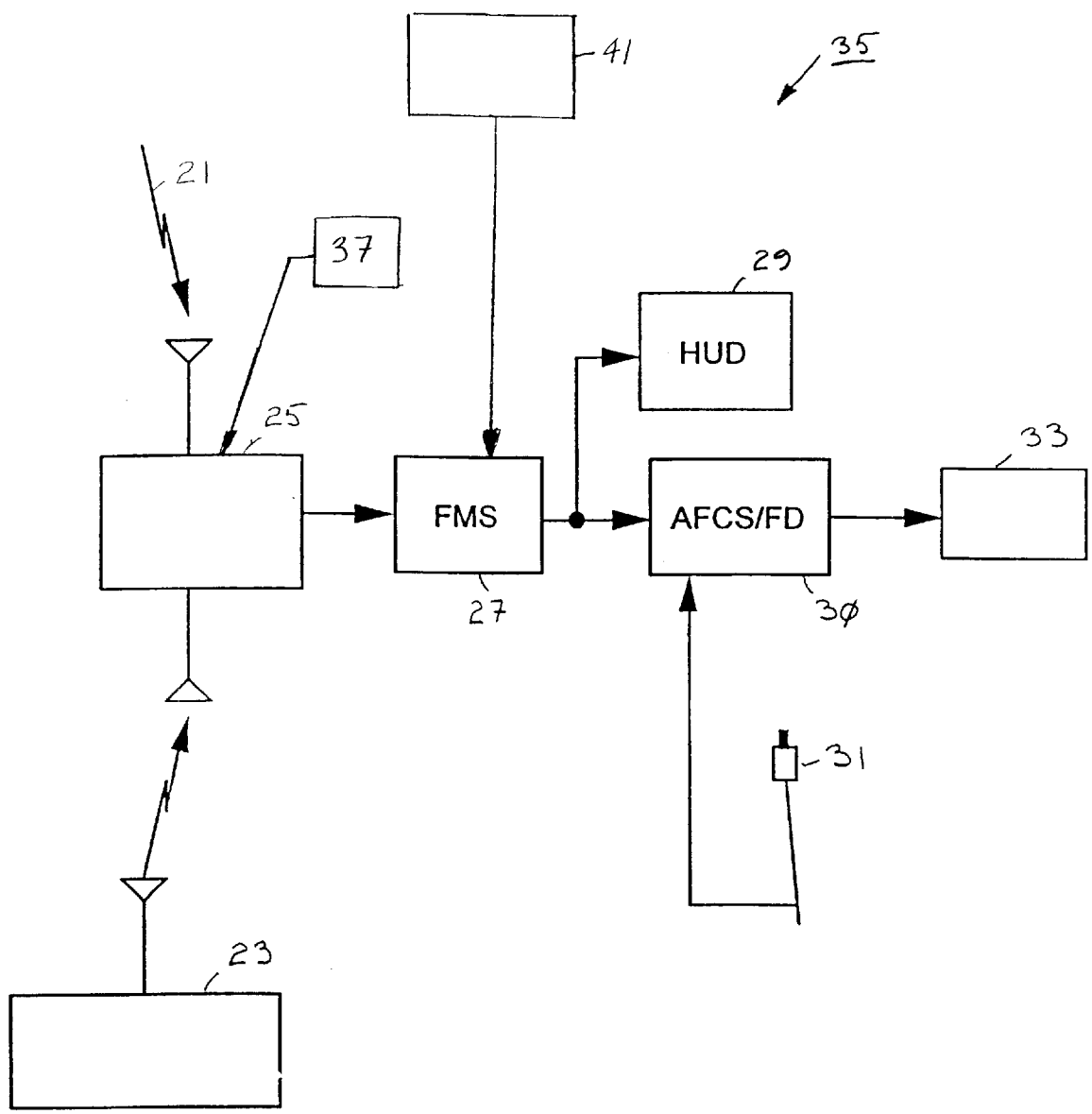
FIG. 1 A block diagram of the automated takeoff system of the present invention.

With reference to FIG. 1 there is illustrated a block diagram of an embodiment of an automated takeoff system 35 for use in the present invention. While illustrated with regard to performing an automated Category A takeoff maneuver, the present invention is drawn broadly to encompass any takeoff maneuver capable of being described by a takeoff profile as described below. Automated takeoff system 35 comprises a positioning system 25, the flight management system (FMS) 27, the automatic flight control system/flight director (AFCS/FD) 30, a pilot display 29, a deadman switch 31, and trim servos 33. A functional description of each component of the system follows.

The FMS 27 is responsible for computing the Category A takeoff profile. The takeoff profile is a description in three dimensions of the path to be followed by an aircraft employing the automated takeoff system 35 of the present invention. The composition of the takeoff profile is discussed more fully below. In addition to computing or otherwise accessing a takeoff profile, the FMS 27 provides steering and velocity commands to the AFCS/FD 30 to ensure that the aircraft is following the takeoff profile.

FMS 27 is a preprogrammed computer capable of receiving input, performing computations upon the input to produce results, and outputting such results. FMS 27 receives as input from positioning system 25 data specifying the location of the aircraft in three dimensions. Comparing the position data to the takeoff profile, the FMS 27 ensures that the aircraft is appropriately positioned and computes and provides deviation commands to the AFCS/FD 30 during the takeoff, and determines when the aircraft has reached a takeoff decision point (TDP).

The FMS 27 is capable of performing these functions because it has access to, as part of the takeoff profile, the exact three dimensional coordinates of the takeoff path it is to follow and it receives very accurate three dimensional aircraft position and velocity data from the positioning system 25.

The FMS 27 can access a previously computed takeoff profile or, in a preferred embodiment, generates the Category A Takeoff profile based in part upon the takeoff position data and the location of the TDP which can be entered manually by a pilot into the FMS 27. In one embodiment, takeoff course module 41 is a user interface through which the pilot enters the position of the aircraft at the desired takeoff point and the position of the TDP location. Takeoff course module 41 has a means for communicating with FMS 27 including, but not limited to, radio or hard-wired connectivity. With these inputs the FMS 27 can automatically generate a 3-dimensional Category A Takeoff profile.

The positioning system 25 operates to determine the position of the aircraft in three dimensions and to output such position information to the FMS 27. In a preferred embodiment, positioning system 25 receives information via satellite 21, such as from the global positioning system (GPS). In another embodiment, positioning system 25 receives data from a ground station 23 from which can be computed the position of the craft. In addition to such systems, positioning system 25 may receive input from an inertial positioning unit 37 located aboard the aircraft. In a preferred embodiment, positioning system 25 receives input data from more than one of the systems including, but not limited to, satellite 21, ground station 23, and inertial positioning unit 37. While described with reference to satellite 21, ground stations 23, and internal positioning unit 37, the present invention is broadly drawn to encompass any and all means by which positioning system 25 can ascertain the position of the aircraft in three dimensions.

Comparing the actual position of the aircraft outputted by the positioning system 25 to the computed takeoff profile, the FMS 27 computes and provides to the AFCS/FD 30 precise profile deviation information. Deviation information may comprise the lateral deviation, vertical deviation, and speed deviations from the takeoff profile. In addition, the FMS 27 provides the AFCS/FD 30 with other necessary data such as whether the aircraft has passed through the TDP. The AFCS/FD 30 is a preprogrammed computing device capable of receiving data, performing calculations upon such data, and outputting results. After receiving as input the deviation information outputted by the FMS 27, the AFCS/FD 30 utilizes the profile deviation data to compute the appropriate aircraft response required to maintain the aircraft on the profile during the takeoff.

The responses thus computed by the AFCS/FD 30 are outputted to the trim servos 33. Trim servos 33 form the flight control surfaces of the aircraft. Upon receiving as input the responses outputted by the AFCS/FD 30, the trim servos 33 operate as instructed to alter the speed and direction of the aircraft in accordance with the takeoff profile.

In an alternative embodiment, simulated position data may be repeatedly computed external to the automated takeoff system 35 and inputted into the FMS 27 resulting in responses computed by the AFCS/FD 30 which can then be outputted to a flight simulator. The simulated position data is repeatedly computed and updated to reflect the actual position of the aircraft if such an aircraft were operated in response to the output of the AFCS/FD 30. As used herein, "flight simulator" refers to any configuration of hardware or software capable of working alone or in concert to create a sensory experience which closely resembles the experience of flying in an aircraft. In such an embodiment, the flight simulator uses the computed responses as inputs to compute an output including, but not limited to, image and audio data. The image and audio data may then be displayed to a pilot to produce an experience similar to that which is experienced during the normal functioning of the automated takeoff system 35. In accordance with such an embodiment, the aircraft is a virtual aircraft maneuvered in response to the computed responses in a virtual manner.

In addition, the information outputted by FMS 27 serves as the input to pilot display 29. In a preferred embodiment, pilot display 29 is a heads up display (HUD). Pilot display 29 allows the pilot to monitor the progress of the automated takeoff. In addition to visually displaying the output data of FMS 27, pilot display 29 may also combine auditory and other sensory queues to aid the pilot in his interpretation of the data.

Deadman switch 31 outputs a status signal which serves as an input to the AFCS/FD 30. When activated by the pilot, deadman switch 31 outputs a status signal indicating that the pilot is monitoring the automated takeoff. Should the pilot deactivate deadman switch 31, AFCS/FD 30 senses the change in the status signal outputted by deadman switch 31 and acts accordingly to alter the functionality of the automated takeoff system 35. The details of how the deadman switch 31 status signal affects the automated takeoff is discussed more fully below.

Figure 2:
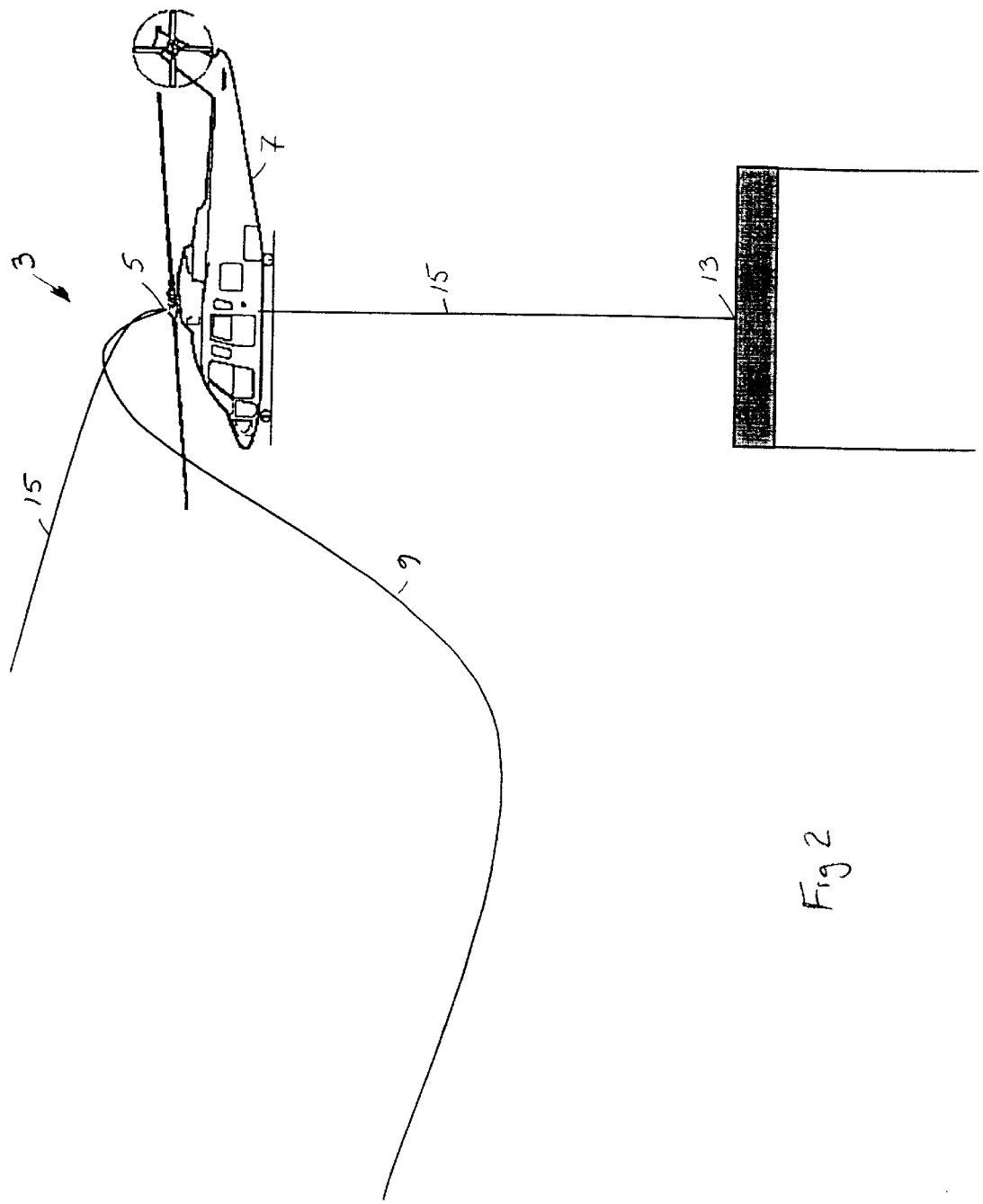
FIG. 2 A diagram of a takeoff profile of the present invention.

Having described the components which comprise automated takeoff system 35, reference is made to FIG. 2 wherein there is illustrated a takeoff profile 3. An aircraft 1 is pictured located at a takeoff decision point 5. Takeoff point 13 is the point in three dimensional space from whence commences the computed takeoff profile 3. In a preferred embodiment as illustrated, the aircraft 1 is a rotary wing aircraft, preferably a helicopter.

Takeoff profile 3 extends generally along flight path 15 from the takeoff point 13, through a TDP 5, and continuing along flight path 15 as illustrated. Takeoff point 13 may be any point on a surface from which an aircraft 1 can takeoff. In a preferred embodiment, takeoff point 13 is coincident with a raised heliport or platform tailored to provide a surface from which a helicopter can takeoff.

Continued takeoff route 9 illustrates the path that an aircraft follows under the automated takeoff system 35 of the present invention in the event of an engine failure. The point at which continued takeoff route 9 deviates from the otherwise continuous extension of takeoff profile 3 along flight path 15 in proximity to the TDP 5, but in any event is not located between TDP 5 and landing point 13. The conditions which may give rise to an aircraft 1 following continued takeoff route 9 are discussed more fully below.

While described with reference to a helicopter performing a Category A takeoff, the present invention is drawn broadly to encompass any aircraft following a predefined takeoff profile using the automated takeoff system 35 of the present invention. The operation of the automated takeoff system of the present invention from its activation through completed takeoff is herein described in detail wherein the Automated Category A Takeoff Mode is divided into two separate modes of operation; the operation of the aircraft 1 prior to reaching the TDP 5, and the operations of the aircraft after reaching the TDP 5. Prior to reaching the TDP 5, the aircraft 1 maintains its position, generally over the takeoff point 13, while climbing vertically to reach the TDP 5. After reaching the TDP 5, the aircraft 1 accelerates and climbs out.

The first phase of the Automated Category A Takeoff Mode requires an initial set-up by the pilot. The pilot must first position the aircraft at the desired takeoff point 13. In a preferred embodiment in which the aircraft is positioned for takeoff from an elevated platform, a desired takeoff point 13 is closer to the edge of the platform as opposed to directly over the center portion of the platform. The pilot next initializes the FMS 27 such that its 3-dimensional takeoff point 13 is very accurately defined by the position system 25 and stored in the FMS 27 for reference during the takeoff. The pilot additionally enters the position of the TDP 5 for the takeoff into the FMS 27. The takeoff point 13 data and the TDP 5 position data may be inputted through takeoff course module 41. This data is used to define the initial vertical takeoff profile and decision point for the Automated Category A Takeoff. In a preferred embodiment, the FMS 27 uses this data to compute the takeoff profile 3.

Once the takeoff profile 3 has been established, the pilot gets the aircraft in a light-on-wheels condition. At this point the pilot initiates the automatic takeoff system 35 by depressing a deadman switch 31. In a preferred embodiment, the status signal generated when the deadman switch 31 is depressed initiates the automated takeoff system 35. Depressing and holding the deadman switch 31 indicates to the AFCS/FD 30 that the pilot is monitoring the progress of the takeoff and will be able to readily intervene in the event of a malfunction. Releasing the deadman switch at any time immediately disengages the automatic takeoff system 35.

Upon engagement of the automatic takeoff system 35, the automatic takeoff system 35 performs to increase the collective setting to achieve a vertical climb at a procedurally defined engine torque setting consistent with takeoff profile 3. During the vertical climb, the AFCS/FD 30 maintains the aircraft generally over the takeoff point 13 using very accurate 3-dimensional position data provided to the FMS 27 by the positioning system 25. The AFCS/FD 30 continues this substantially vertical profile until it reaches the TDP 5.

At the TDP 5 the aircraft is committed to a takeoff and the AFCS/FD 30 initiates the second phase of the automatic takeoff. During this phase the AFCS/FD 30 performs the acceleration and climb out profile reflected in the takeoff profile 3. Because of the varying characteristics of aircraft 7 that can utilize the present invention to perform an automated takeoff, takeoff profile 3 will be aircraft type specific.

For increased situational awareness during the automated takeoff, pilot display 29 transmits the output of the FMS 27 to the pilot or pilots of the aircraft 1. The pilot display 29 allows the pilot to maintain visual contact with the environment surrounding the aircraft 1 while monitoring the progress of the automated takeoff. The display methodology for the pilot display 29 may take any form sufficient to transmit the output of the FMS 27 to the pilot.

Throughout the Automated Category A Takeoff operation the AFCS/FD 30 continually monitors the status of the engines and can readily identify a One Engine Inoperable, OEI, condition. If an OEI condition occurs prior to reaching the TDP 5, the AFCS/FD 30 alerts the pilot of the failure and initiates a reject takeoff procedure. In the event that a reject takeoff procedure is initiated, the AFCS/FD 30 lowers the collective to descend the aircraft 1 while making longitudinal and lateral cyclic corrections to ensure that the aircraft is appropriately positioned over a landing area. The landing area may be a predetermined location suitable for such a landing and included in the computed takeoff profile 3. In a preferred embodiment, the landing area is coincident with the takeoff point 13. Prior to arriving at the landing area, the AFCS/FD 30 levels the aircraft attitude and activates an audible tone to indicate to the pilot the exact time to perform the final collective pull to cushion the landing. The pilot is required to perform this final collective pull because it is a large amplitude and rapid input. This procedure eliminates the possibility of the pilot instinctively restricting the motion of the collective if the input to the trim servos 33 was inputted automatically by the AFCS/FD 30.

In the event of an OEI condition occurring after reaching the TDP 5, the AFCS/FD 30 performs a continued takeoff procedure which accelerates the aircraft and then climbs out according to takeoff profile 3 by proceeding along continued takeoff route 9. Continued takeoff route 9 is similar to the normal acceleration profile followed in the absence of an OEI condition, with the exception that the rotor speed must be closely monitored and adjustments made to the collective as necessary to optimize the aircraft performance for the OEI condition.

What is claimed is:

1. A method for automating a takeoff maneuver for an aircraft, comprising the steps of:
    generating a takeoff profile comprising a takeoff point, a flight path, and a takeoff decision point (TDP);
    engaging an automated takeoff system to access said takeoff profile;
    receiving periodic position data of the aircraft;
    comparing said position data to said takeoff profile to compute a plurality of deviations each time said position data is received;
    outputting said plurality of deviations to a display;
    converting said plurality of deviations into a plurality of control commands; and
    maneuvering said aircraft in response to said control commands along said flight path.

2. The method of claim 1 wherein said takeoff profile additionally comprises a continued takeoff route.

3. The method of claim 2 comprising the additional step of activating a deadman switch to output a pilot monitor status.

4. The method of claim 3 comprising the additional steps of:
    sensing the occurrence of an engine failure; and
    responding to said occurrence of said engine failure by maneuvering said aircraft in response to said control commands along said continued takeoff route when said occurrence of said engine failure is sensed after said aircraft passing said takeoff decision point.

5. The method of claim 4 wherein said takeoff profile additionally comprises a landing area.

6. The method of claim 5 comprising the additional steps of:
    sensing the occurrence of an engine failure; and
    responding to said occurrence of said engine failure by maneuvering said aircraft in response to said control commands along said flight path to said landing area when said occurrence of said engine failure is sensed before said aircraft passing said takeoff point; and issuing an alert to perform a final collective pull.

7. The method of claim 6 wherein said landing area is coincident with said takeoff point.

8. The method of claim 2, wherein said generating said takeoff profile is performed by a flight management system.

9. The method of claim 2, wherein said receiving said position data is performed by a positioning system.

10. The method of claim 2, wherein said computing said plurality of deviation is performed by said flight management system.

11. The method of claim 2, wherein said converting said plurality of deviations into said plurality of control commands is performed by an automatic flight control system/flight director (AFCS/FD).

12. The method of claim 2, wherein generating the takeoff profile comprises the additional steps of:

inputting takeoff point positional data; and inputting takeoff decision point positional data.

13. The method of claim 2 wherein said display is a heads up display (HUD).

14. The method of claim 2 wherein said outputted plurality of deviations prompt auditory queues.

15. The method of claim 2 wherein said position data is received from at least one satellite.

16. The method of claim 2 wherein said position data is received from at least one ground station.

17. The method of claim 2 wherein said position data is received from an inertial positioning unit.

18. The method of claim 2 wherein said takeoff point is coincident with a raised heliport.

19. The method of claim 2 wherein said aircraft is a helicopter.

20. A system for enabling a takeoff maneuver comprising:

a positioning system for determining a position of an aircraft and outputting said location as position data;

a flight management system (FMS) capable of accessing or computing a takeoff profile, receiving as input said position data, comparing said position data to said takeoff profile to compute deviation data and outputting said deviation data;

a deadman switch capable of outputting a status signal;

an automatic flight control system/flight director (AFCS/FD) receiving as input said status signal and said deviation data and outputting control commands;

at least one trim servo for receiving said control commands and responding so as to alter the speed and direction of said aircraft; and a pilot display receiving as input said deviation data.

21. The system of claim 20 wherein said position data is received from at least one satellite.

22. The system of claim 20 wherein said position data is received from at least one ground station.

23. The system of claim 20 wherein said position data is received from an inertial positioning unit.

24. The system of claim 20 wherein said takeoff profile comprises an takeoff point, a flight path, a takeoff decision point (TDP), and a continued takeoff route.

25. The system of claim 20 wherein said pilot display is a heads up display (HUD).

* * * * *